J. E. GROSJEAN.
METHOD OF MANUFACTURING COMPOSITE SOLES FOR BOOTS OR SHOES.
APPLICATION FILED MAY 15, 1918.

1,344,503.  Patented June 22, 1920.

Witnesses

Inventor:
James E. Grosjean,
by
Attorney.

UNITED STATES PATENT OFFICE.

JAMES E. GROSJEAN, OF LIMA, OHIO, ASSIGNOR, BY DIRECT AND MESNE ASSIGNMENTS, OF ONE-FOURTH TO LEON F. MONTGOMERY, OF FORT RECOVERY, OHIO, AND ONE-FOURTH TO FRANK L. MAIRE, OF LIMA, OHIO.

METHOD OF MANUFACTURING COMPOSITE SOLES FOR BOOTS OR SHOES.

1,344,503.   Specification of Letters Patent.   Patented June 22, 1920.

Application filed May 15, 1918. Serial No. 234,709.

*To all whom it may concern:*

Be it known that I, JAMES E. GROSJEAN, a citizen of the United States, residing at Lima, in the county of Allen and State of Ohio, have invented new and useful Improvements in Methods of Manufacturing Composite Soles for Boots or Shoes, of which the following is a specification.

This invention relates to an improved method of manufacturing composite soles for boots or shoes of the general type which has permanently and substantially integrally incorporated therewith tread portions whose parts or components are arranged to produce anti-skid, and preferably also cushioning, effects. By the term "sole" I refer to the whole sole or to any part thereof with which a tread portion of the character stated may be incorporated, whether such tread portion extend over the whole sole or over the heel or over the sole in the ordinary and narrow sense of the term, *i. e.*, the forward portion of the whole sole which provides support for the ball of the foot and the toes.

The objects of the invention are to facilitate and lessen the cost of the manufacture of soles of the type referred to and to produce a sole which shall have superior qualities in respect of flexibility and comfort, durability and cushion and anti-skid effects.

The manner of practising the method will be apparent from the accompanying drawing, considered in connection with the subjoined description.

In said drawing:—

Similar characters of reference designate corresponding parts throughout the several views.

Figure 1:
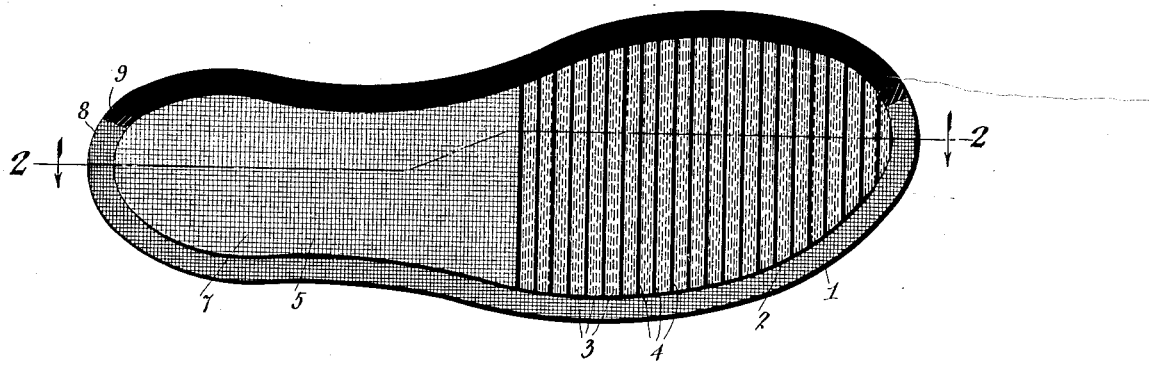
Figure 1 is a bottom plan view of a sole in course of manufacture according to the present method.
Figure 2:
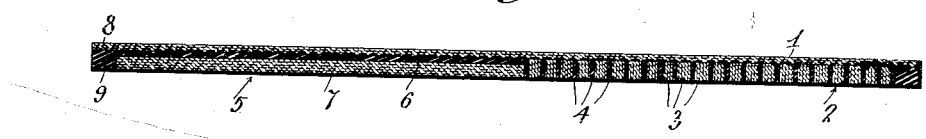
Fig. 2 is a central vertical sectional view thereof.

In the manufacture of a sole in accordance with the method of the present invention there is produced, in any suitable manner, a relatively thin and substantially flat base or backing 1 conforming in area and outline to the finished sole and whose material admits of vulcanization and is strong yet readily flexible. As the material of said base, I preferably employ canvas which is preferably laminated, three connected plies having been found very satisfactory, and is thoroughly impregnated with a compound of vulcanized material, preferably rubber. As composed of canvas the base 1 may be fashioned from fresh stock or from reclaimed stock. As reclaimed stock the canvas of old or discarded tire casings may be employed. Canvas derived from this source will, of course, have rubber incorporated therewith but it is preferred to treat the same similarly to fresh canvas as regards impregnation with a compound of vulcanizable material.

The tread portion 2 is preferably produced separately from the base 1. Said tread portion is composed principally of textile material whose threads are presented endwise to the thread surface. In the construction preferred the tread portion is cut from sheet material which has a suitable and characteristic arrangement of textile fabric and of rubber or equivalent vulcanizable material and whose components are in adherent relation. The textile fabric of the tread portion should be thoroughly impregnated with a compound of vulcanizable material.

The tread portion is initially secured to the base 1, adjacent its underface, in any suitable manner but preferably by suitable cement or adhesive material and is shown as located in the forward portion of the whole sole but it may be extended throughout the whole sole or may be located or duplicated in the heel.

As shown, the tread portion is composed of strips of textile fabric 3, preferably canvas, and vulcanizable material 4, preferably rubber, arranged in alternation and disposed transversely, the textile fabric strips 3 being preferably laminated and composed of several, *e. g.* four or five, plies. The textile fabric of the tread portion may be fresh or new stock or reclaimed stock, for example, the fabric of old or discarded tire casings which may be prepared by stripping the rubber tire tread therefrom. Where the tread portion is of the construction shown, *i. e.* composed of alternate strips of canvas 3 and rubber 4, it is preferably prepared by forming a strip of indeterminate length composed of a layer of canvas and an associated layer of rubber, cutting said strip into sections, building the sections by layers into a sheet structure in which the layers are caused to adhere together, for example, by means of the use of an adhesive material and the subjection of the sheet structure to pressure, and cutting from the sheet structure a tread portion of the outline desired.

As regards whole soles, in case the tread portion occupies only a part of the area of the whole sole, the latter is built up to suitable thickness, preferably to the thickness of the tread portion by the application throughout the rest of its area of a member 5' which, like the tread portion, may be initially secured to the base 1 by suitable cement or adhesive material. Where, as shown, the tread portion 2 is located in the forward portion of the whole sole the member 5 conforms to the shank and heel portions of said sole. Said member may be composed entirely of rubber or equivalent vulcanizable material or of laminated fabric or it may be composed of layers of vulcanizable material, e. g. rubber, and laminated fabric. As shown said member is composed of a relatively thin sheet of rubber 6 which is arranged in adjacency to the base 1 and a somewhat thicker sheet of laminated canvas 7 which is secured to the sheet of rubber 6. In any case the member 5 will be strong, durable and readily flexible. As composed in whole or in part of laminated fabric the stock of the member 5 may be fresh or reclaimed, e. g. the canvas may be derived from old or discarded tires. In either case, the canvas should be thoroughly impregnated with a compound of vulcanizable material.

The sole is preferably completed by a marginal supporting strip 9 of vulcanizable material, preferably rubber, which may, or may not, have textile fabric incorporated therewith, the tread portion 2 being arranged within said strip whose inner edge adjoins and conforms in outline to the edge of said tread portion. It is preferred to provide the base 1 with a marginal projecting portion 8 of suitable width upon which the strip 9 is laid. As regards the construction shown, the combined area of the tread portion 2 and the member 5 is less than the area of the base 1 whereby said tread portion and member may be so arranged on said base that the latter will have a projecting portion which constitutes the aforesaid marginal portion 8 and preferably entirely circumscribes the tread portion 2 and member 5; and the marginal supporting strip 9 of vulcanizable material is laid on the marginal portion 8 in the same plane as the tread portion 2 and member 5, said strip being co-extensive with said marginal portion and initially secured in any suitable manner, preferably by suitable cement or adhesive material. The strip 9 may be continuous or it may be formed in juxtaposed complementary sections. After the tread portion, together with the associated parts which may be employed, has been placed in position on the base 1, in the manner described, the sole is vulcanized throughout, the pressure employed preferably being exceptionally heavy and the vulcanization effecting the most secure union of the adjacent parts. Thus the rubber or equivalent material of the tread portion is united with the utmost security to the textile fabric of the tread portion, the tread portion as an entirety is similarly united to the base 1 which, if composed of textile fabric, has its laminæ similarly united, the supporting strip 9 if employed as preferred, is similarly united both to the base 1 and the tread portion 2, having a homogeneous union with the rubber or equivalent material of said tread portion, and the member 5, if employed, is similarly united to the tread portion, the base 1 and the supporting strip 9. Where said member is composed of the rubber and canvas sheets 6 and 7 a similar permanent union of said sheets and of the laminæ of the canvas sheet is likewise effected.

Figure 3:
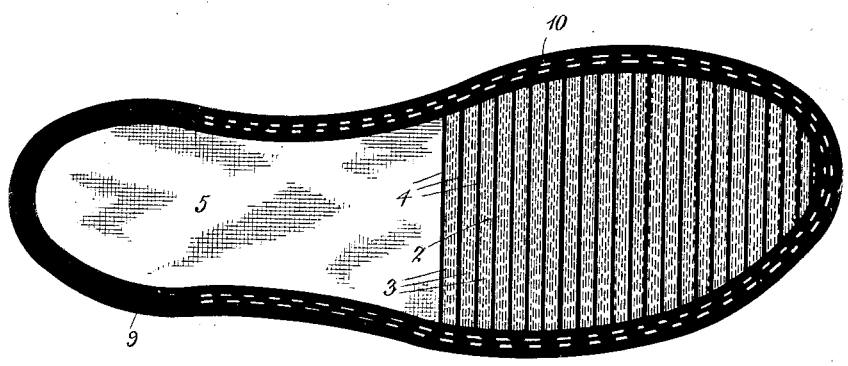
Fig. 3 is a bottom plan view of the sole as completed and ready for use.

The sole, as finished by vulcanization, is shown in Fig. 3. If desired, but merely as a measure adopted out of an abundance of precaution, the base may, subsequent to the vulcanization of the sole be connected by stitching 10 to the above described parts bonded thereto, and to one another, the stitching being preferably provided in parallel rows and along the supporting strip 9.

Either before or after the vulcanization of the sole the parts thereof which are, or may be, composed of textile fabric, may, if desired, be treated for the purpose of enhancing the durability of the fabric and of giving it efficient moisture proof qualities, such treatment consisting in forcing into the fabric under pressure any suitable compound for the purpose in view, for example, a compound having a base of paraffin, wood tar pitch, or rubber, or a compound of varnish and siccative.

The method described may be practised with marked facility and economy; it enables the shoe to be made in principal part from textile fabric which may be reclaimed from waste products and it produces a sole which possesses a substantial measure of flexibility and has greatly superior durability and wearing qualities; and without the introduction of any manufacturing complications it enables the production of a relatively extensive anti-skidding tread portion whose components may be so combined and related as to achieve sensible and very beneficial cushion effects.

What I claim is:—

1. The method of manufacturing composite soles for boots or shoes which consists in producing a substantially flat, relatively thin, flexible base, disposing thereon an originally separate tread portion having components of textile material, the ends of whose threads are presented to the tread surface, applying to said base and tread portion a marginal strip of vulcanizable material within which said tread portion is arranged and vulcanizing said base, tread portion and marginal strip under heavy pressure in their assembled relation whereby said tread portion and strip are bonded to one another and to said base.

2. The method of manufacturing composite soles for boots or shoes which consists in producing a substantially flat, relatively thin, flexible base, disposing thereon an originally separate tread portion of less area and having components of textile material, the ends of whose threads are presented to the tread surface, and arranging said tread portion whereby said base has a marginal portion projecting therefrom, applying to the marginal portion of said base a strip of vulcanizable material within which said tread portion is arranged, and vulcanizing said base, tread portion and marginal strip under heavy pressure in their assembled relation whereby said tread portion and strip are bonded to one another and to said base.

3. The method of manufacturing composite soles for boots or shoes which consists in producing a substantially flat, relatively thin, flexible base conforming in area and outline to the whole sole, disposing on a portion of said base a tread portion having components of textile material, the ends of whose threads are presented to the tread surface, disposing on the remaining portion of the base a member of sheet form by which the sole is built up to a desired thickness and vulcanizing said base, tread portion and member under heavy pressure in their assembled relation whereby said tread portion and member are bonded to one another and to said base.

4. The method of manufacturing composite soles for boots or shoes which consists in producing a substantially flat, relatively thin, flexible base conforming in area and outline to the whole sole, disposing on a portion of said base a tread portion having components of textile material, the ends of whose threads are presented to the tread surface, disposing on the remaining portion of the base a member of sheet form by which the sole is built up to a desired thickness, arranging said portion and member whereby said base has a marginal portion projecting therefrom, disposing on said marginal portion a marginal strip of vulcanizable material within which said tread portion and member are arranged, and vulcanizing said base, tread portion, member and marginal strip under heavy pressure in their assembled relation, whereby said tread portion and member are bonded to one another and to said marginal strip and whereby said tread portion, said member and said marginal strip are also bonded to said base.

In testimony whereof I have hereunto set my hand in presence of a subscribing witness.

JAMES E. GROSJEAN.

Witness:
   Chas. S. Hyer,